Jan. 27, 1925.                                           1,524,502
                         I. BAYER
       AUTOMOBILE SIGNAL LIGHT AND TRAFFIC INDICATOR
              Filed June 8, 1922        2 Sheets-Sheet 1

Inventor
Ignatz Bayer,
By
Attorneys

Jan. 27, 1925.
I. BAYER
1,524,502
AUTOMOBILE SIGNAL LIGHT AND TRAFFIC INDICATOR
Filed June 8, 1922    2 Sheets-Sheet 2
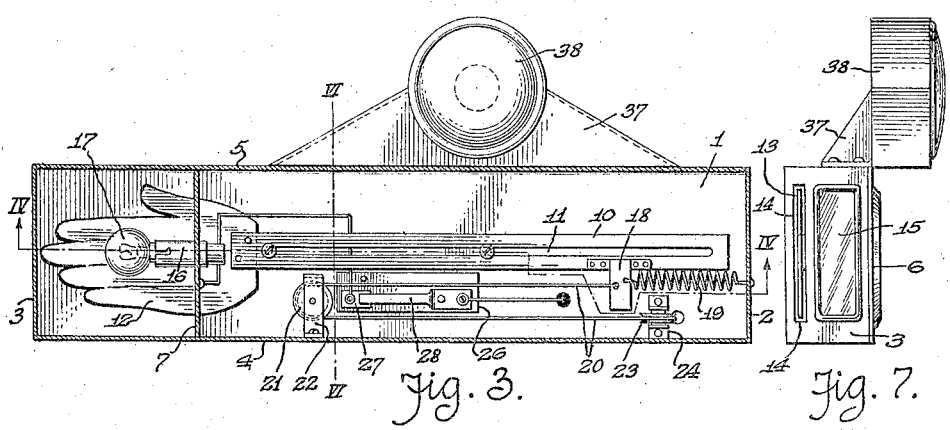
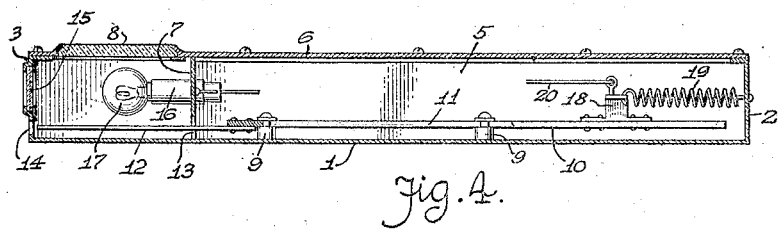
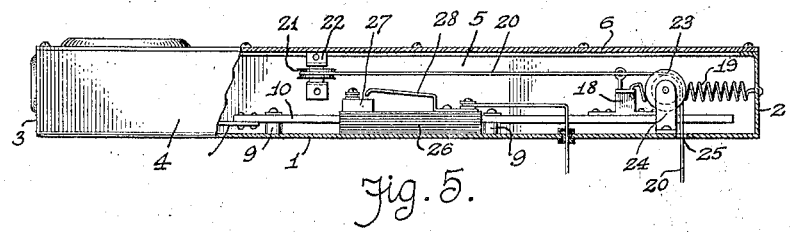
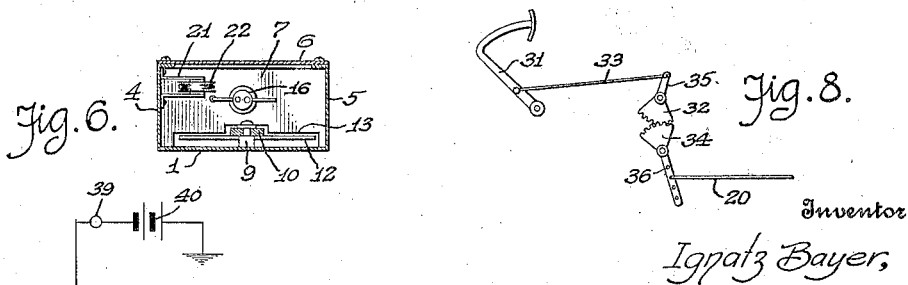
Inventor
Ignatz Bayer,
By
Attorneys Patented Jan. 27, 1925.

1,524,502

UNITED STATES PATENT OFFICE.

IGNATZ BAYER, OF DETROIT, MICHIGAN.

AUTOMOBILE SIGNAL LIGHT AND TRAFFIC INDICATOR.

Application filed June 8, 1922. Serial No. 566,750.

*To all whom it may concern:*

Be it known that I, IGNATZ BAYER, a citizen of Yugoslavia, residing at Detroit, in the county of Wayne and State of Michigan, have invented certain new and useful Improvements in Automobile Signal Light and Traffic Indicators, of which the following is a specification, reference being had therein to the accompanying drawings.

This invention relates to a signal light and traffic indicator for vehicles, and has special reference to a direction indicator that may be mounted on the rear end of an automobile or other vehicle to indicate to a following automobile that the signal carrying automobile is about to turn or change direction of travel, thus warning the driver or chauffeur of the following automobile in sufficient time to avoid a rear-on collision or accident incident to congested traffic.

The primary object of my invention is to provide a direction indicator with which may be associated the ordinary tail lamp and in addition to this lamp the direction indicator includes a flash lamp automatically illuminated and a tell-tale lamp illuminated in synchronism with said flash lamp, said flash lamp assisting in the illumination of the indicator and attracting attention thereto, while said telltale lamp informs a driver or chauffeur of the signal carrying automobile that the signal on the rear end of the automobile is working satisfactorily.

Another object of this invention is to provide a traffic indicating device embodying a reciprocable spring retracted indicator safely housed and protected within a casing and adapted to be protected therefrom. The projection of the indicator may be accomplished from a clutch, brake or other control pedal or lever of an automobile and operation of the indicator causes the lamp to be illuminated so that the signal will serve its purpose in the dark as well as in the light.

A further object of my invention is to provide a direction indicator wherein the parts are constructed with a view of reducing the cost of manufacture and at the same time retain those features by which safety, durability and accessibility are secured. With such ends in view my invention resides in the novel construction to be hereinafter specifically described and then claimed.

Fig. 3 is an enlarged longitudinal vertical sectional view of the signalling device;

Fig. 4 is a horizontal sectional view taken on the line IV—IV of Fig. 3;

Fig. 5 is a plan of the device, partly broken away and partly in section;

Fig. 6 is a cross sectional view taken on the line VI—VI of Fig. 3;

Fig. 7 is a view of the outer end of the signalling device;

Fig. 8 is a side elevation of a pedal actuated mechanism that may be used to actuate my signal; and Fig. 9 is a wiring diagram of the signalling device.

Figure 2:
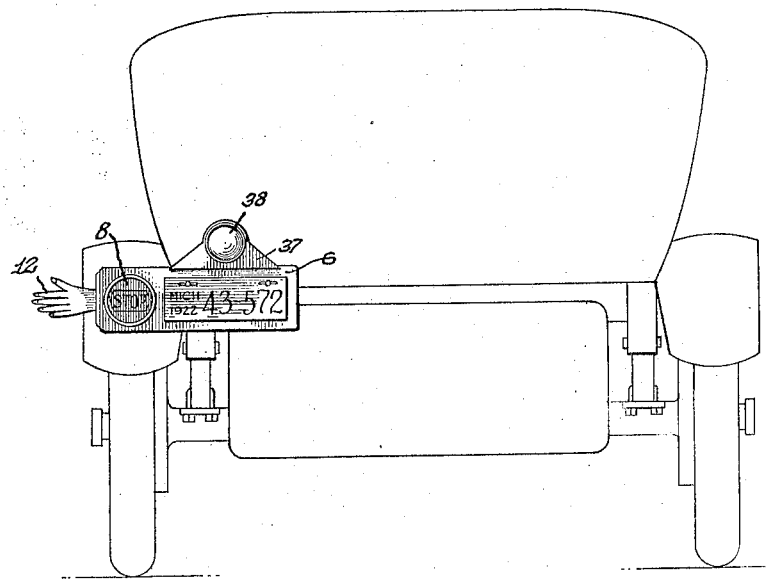
Fig. 2 is a rear elevation of the automobile showing the signal device as having been operated.

Reference will first be had to the signal exhibitor or indicator which is adapted for mounting at the rear end of an automobile, but may be placed at any other place on such a machine or vehicle. The exhibitor comprises an oblong metallic casing having a rear wall 1, end walls 2 and 3, bottom wall 4, a top wall 5, a detachable front wall 6, and a transverse partition 7, said partition being located adjacent the end wall 3 and providing a small lamp compartment and a large mechanism compartment within the casing. The detachable front wall 6 may be secured by screws or other fastening means to inturned flanges of the walls 2, 3, 4 and 5. That end of the front wall 6 closing the lamp compartment is provided with a lens 8 that will serve as a warning when illuminated, the lens containing suitable indicia for instance, the word "stop" as shown in Fig. 2 or it may be simply red in color to indicate danger.

On the inner face of the rear wall 1 are posts 9 supporting a slidable indicator member 10 which has a longitudinal slot 11 to receive the ends of the posts 9 and the end walls of said slot will limit the inward and outward movement of the indicator member by contracting with said posts. The posts 9 holds the exhibitor member 10 in parallelism with the wall 1 and mounted on one end of said member is a display member 12 preferably in the form of a hand extending into the lamp compartment through a slot or cut away portion 13 of the partition 7 and the display member is adapted to be projected through a slot 14 in the end wall 3, as shown in Fig. 2, to warn the driver of a following automobile that the signal carrying automobile is about to stop, slow up or change direction of travel. The end wall 3 has a window 15 and the partition 7 is provided with a lamp socket 16 for an incandescent lamp 17, which when illuminated will cast rays of light through the lens 8 and the window 15, the latter permitting of the display member 12 being observed in the dark.

Mounted on the indicator member 10 is a combined cable and spring connector 18 connected by a coiled retractile spring 19 to the end wall 2 of the casing and attached to the connector 18, in alinement with the coiled spring 19, is the inner end of a cable or flexible member 20 trained over a sheave 21 rotatable between bearings 22 carried by the bottom wall 4 in proximity to the partition 7. The cable is also trained over a horizontally disposed sheave 23 rotatable between bearings 24, carried by the rear wall 1, and said cable extends out of an opening 25 in the rear wall 1. If the outer end of the cable 20 is pulled upon the indicator member 10 is shifted and the display member 12 projected from the casing, such shifting of the indicator member placing the coiled spring 19 under additional tension so that when the cable is released or slack the retractile force of the spring will return the indicator member 10 to its normal position within the mechanism compartment of the casing.

Mounted on the rear wall 1 is an insulator 26 provided with a contact member 27 and a resilient inclined switch arm 28 in the path of the connector 18 and adapted to be pressed thereby into engagement with the contact member 27 to close said switch.

Figure 1:
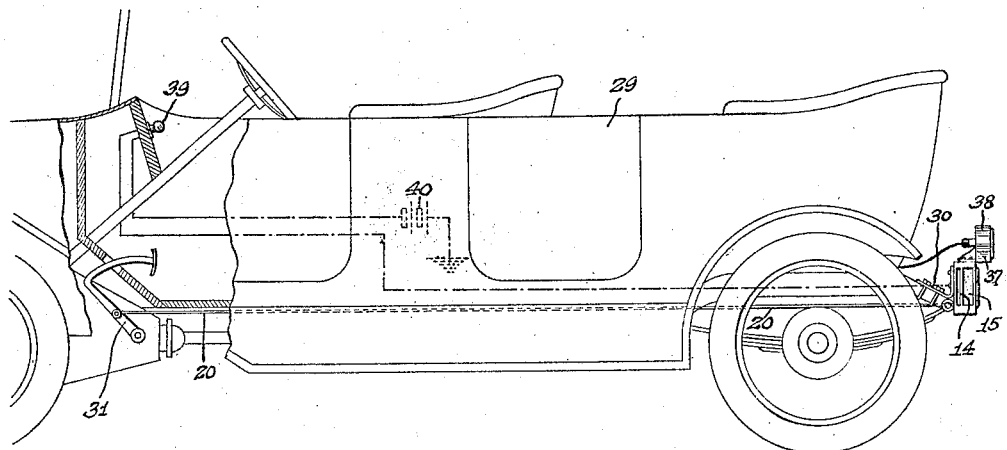
Figure 1 is a side elevation of a portion of an automobile provided with a signalling device in accordance with my invention.

As set forth in the beginning the exhibitor is adapted to be mounted at the rear end of an automobile 29 and as shown in Fig. 1 the rear wall 1 of the exhibitor may have a suitable bracket 30 by which it may be conveniently attached to the automobile. The cable or flexible member 20 is adapted to extend forwardly to a clutch pedal 31 so that when said clutch pedal is depressed by the driver or chauffeur of the automobile, to throw the clutch out the exhibitor will be actuated. In some instances the throw or movement of the clutch pedal may not be sufficient to fully actuate the exhibitor in which case sector gears 32 and 34 may be employed and suitably mounted relative to the automobile body. The sector gear 32 has a short crank 35 connected by a rod 33 to the clutch pedal 31, and the sector gear 34 has a long apertured crank 36 to which the cable 20 may be connected. By providing the long crank 36 with a series of apertures it is possible to connect the cable 20 so that it will accurately actuate the exhibitor in accordance with the adjustment of the clutch pedal or any other operating instrumentality to which the cable may be indirectly connected.

Mounted on the top wall 5 of the exhibitor casing is a bracket 37 supporting a regulation or required tail lamp, and by reference to Figs. 1 and 9 it will be noted that this tail lamp and the tail lamp 17 may be in circuit with a common source of electrical energy, but since the tail lamp 38 must be at all times illuminated at night or during the operation of the automobile, I prefer to place the lamp 17 in a separate circuit with a tell-tale lamp 39 mounted on the instrument board of the automobile 29. The tell-tale lamp 39 is in circuit with a suitable source of electrical energy, as battery cells 40 and when the switch arm 28 is actuated by the connector 18, the tell-tale lamp will be illuminated in synchronism with the lamp 17, thus indicating to the driver or chauffeur of the automobile that the exhibitor is working satisfactorily.

It is thought that the operation and utility of my invention will be apparent without further description, and while in the drawings there are illustrated the preferred embodiments of my invention, it is to be understood that the structural elements are susceptible to such variations and modifications as fall within the scope of the appended claim.

What I claim is:—

A signalling device comprising a casing having a partition therein providing a lamp compartment and a mechanism compartment, an electric lamp in said lamp compartment, an indicator slidably supported in said mechanism compartment and extending through said partition into said lamp compartment and adapted to be projected from an end wall of said lamp compartment, a switch in said mechanism compartment in circuit with said lamp, a connector on said indicator adapted to engage and close said switch when said indicator is projected from said lamp compartment, and means connected to said connector to facilitate projecting said indicator.

In testimony whereof I affix my signature in presence of two witnesses.

IGNATZ BAYER.

Witnesses:
 OTTO F. BARTHEL,
 ANNA M. DORR.